US012730927B2

(12) United States Patent
Paes et al.

(10) Patent No.: US 12,730,927 B2
(45) Date of Patent: Sep. 8, 2026

(54) ADAPTABLE FRAMEWORK FOR INTEGRATION OF GENERATIVE ARTIFICIAL INTELLIGENCE

(71) Applicant: AMERICAN EXPRESS TRAVEL RELATED SERVICES COMPANY, INC., New York, NY (US)

(72) Inventors: Pedro Burglin Paes, Peoria, AZ (US); Andras L. Ferenczi, Scottsdale, AZ (US); Hiranmayi Palanki, Tampa, FL (US); Mukund Shankar Simharaghu, Glendale, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 18/391,044

(22) Filed: Dec. 20, 2023

(65) Prior Publication Data

US 2025/0209200 A1 Jun. 26, 2025

(51) Int. Cl.

| | |
|---|---|
| ***G06F 21/62*** | (2013.01) |
| ***G06F 21/10*** | (2013.01) |
| ***G06F 21/44*** | (2013.01) |
| ***G06N 20/00*** | (2019.01) |
| *H04L 9/40* | (2022.01) |

(52) U.S. Cl.
CPC ...... *G06F 21/6245* (2013.01); *G06F 21/1064* (2023.08); *G06F 21/44* (2013.01); *G06N 20/00* (2019.01); *H04L 63/12* (2013.01)

(58) Field of Classification Search
CPC ... G06F 21/6245; G06F 21/1014; G06F 21/10
See application file for complete search history.

(56) References Cited

U.S. PATENT DOCUMENTS

| | | | | |
|---|---|---|---|---|
| 2003/0172120 | A1* | 9/2003 | Tomkow | G06Q 10/107 709/202 |
| 2004/0030788 | A1* | 2/2004 | Cimo | H04L 69/329 709/229 |
| 2013/0080377 | A1* | 3/2013 | Newnham | G06N 5/02 706/52 |

(Continued)

*Primary Examiner* — William R Korzuch
*Assistant Examiner* — Aditya Sriram
(74) *Attorney, Agent, or Firm* — STERNE, KESSLER, GOLDSTEIN & FOX P.L.L.C.

(57) ABSTRACT

Disclosed herein are system, method, and computer program product embodiments for managing generative artificial intelligence (AI) queries from client systems and responses to the queries from generative AI systems. A request management system may provide an adaptable framework for receiving, managing, monitoring, and/or controlling generative AI queries received from client systems seeking generative AI content. The request management system may authenticate client systems and generative AI systems. The request management system may also administer security and observabilities protocols to the queries and responses. The request management system may identify a ruleset that includes one or more conditions that indicate whether the queries and responses may be forwarded to the generative AI systems and client systems, respectively. This may provide enterprise computing control over interactions between client devices and generative AI systems.

20 Claims, 7 Drawing Sheets

(56) References Cited

U.S. PATENT DOCUMENTS

| | | | | |
|---|---|---|---|---|
| 2023/0130985 | A1* | 4/2023 | Hubin | G06F 21/577<br>726/22 |
| 2024/0296315 | A1* | 9/2024 | Singh | G06F 16/3349 |
| 2025/0055867 | A1* | 2/2025 | Ahmed | G06F 16/2365 |
| 2025/0068741 | A1* | 2/2025 | Lafon | G06F 16/3344 |

* cited by examiner

300B

ADAPTABLE FRAMEWORK FOR INTEGRATION OF GENERATIVE ARTIFICIAL INTELLIGENCE

BACKGROUND

Field

This field is generally related to providing a framework for managing requests to and responses from generative artificial intelligence (AI) applications.

Related Art

The use of generative artificial intelligence (AI) systems in the course of business operations continues to expand. Businesses are determining best practices for integrating generative AI systems into the workflow of a business. Some important factors for consideration may include security, access controls, detecting misuse, advanced observability to manage detected misuse, assessing the quality of generative AI responses, as well as other factors that may impact the work product or workflow of a business. Many of these factors, e.g. security, operational controls, and governance, may be at least partially controlled by individual generative AI systems. All of which may have different standards and processes in place, depending on vendor of the generative AI.

This means that businesses relying on generative AI systems for these types of controls do not have a standardized experience when utilizing different generative AI systems. The reliance on generative AI systems for certain controls coupled with the lack of standardization may make it difficult to standardize internal practices for generative AI utilization and integration. Further, the lack of control over implementing the security protocols of the entity or organization means that it may be difficult or nearly impossible to adequately detect and prevent misuse of generative AI systems within the entity. This may create risk for the entity because the adherence to security standards may be left to the individual, client system, and/or generative AI system.

BRIEF SUMMARY

Disclosed herein are system, apparatus, device, method and/or computer program product embodiments, and/or combinations and sub-combinations thereof, for integrating generative AI systems using an adaptable framework that manages queries from client systems and responses to the queries from generative AI system. In some embodiments, the systems and methods described herein may be used to provide a framework for integration of multiple generative AI systems for use by one or more client systems. The framework may provide security controls, governance, and/or observability of generative AI requests and/or responses regardless of the generative AI system(s) being used by the client system.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1A:
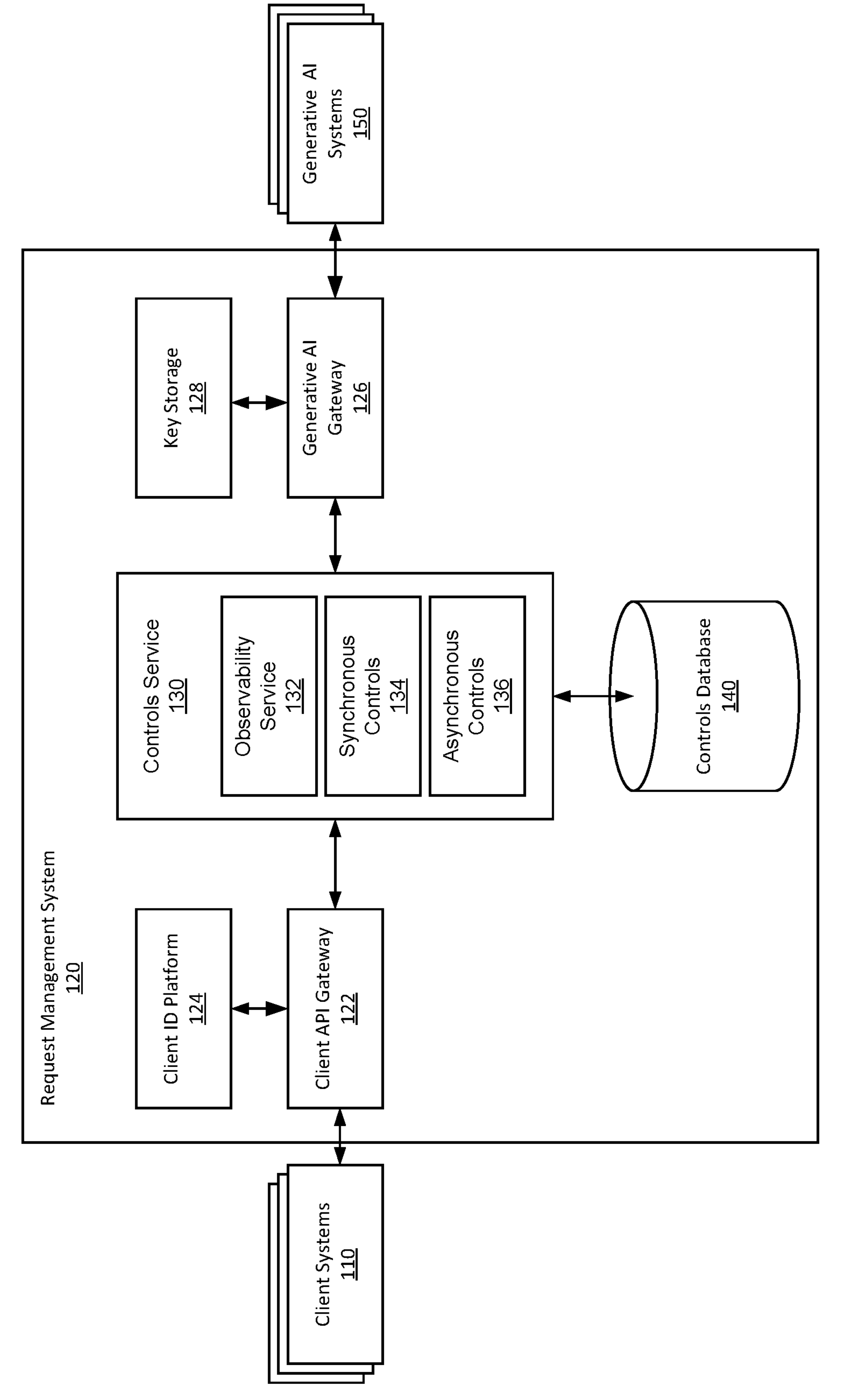
FIG. 1A depicts a block diagram of a generative AI system integration environment, according to some embodiments.

Provided herein are system, apparatus, device, method and/or computer program product embodiments, and/or combinations and sub-combinations thereof, for an adaptable framework to integrate communications to and from generative artificial intelligence (AI) systems for client systems.

In some embodiments, the systems and methods described herein may be used to provide a framework for integration of multiple generative AI systems for use by one or more client systems. The framework may provide security controls, governance, and/or observability of generative AI requests and/or responses regardless of the generative AI system(s) being used by the client system.

In some embodiments, a request management system may receive a generative AI query from a client system that requests a response to the query from a generative AI system. The request management system can register generative AI systems for use and may control communications with these generative AI systems. The request management system may identify a ruleset that defines conditions for forwarding generative AI queries to one or more generative AI systems. The ruleset may prevent various threats, e.g., personal identifiable information and/or bias, from being provided to the generative AI system via the query. The ruleset may be individualized for the client system, generative AI system, and/or the entity implementing the request management system. The request management system may determine the content of the query satisfies the ruleset. Once the request management system has determined that the query satisfies the ruleset, the query may be transmitted to one or more generative AI systems.

The request management system may also receive the response to the query generated by the one or more generative AI systems. Similar to the request and query described above, the request management system may determine whether the content of the one or more responses satisfies the ruleset. The ruleset applicable to responses from generative AI systems may be a subset of the ruleset. Specifically, there may be rules to check for certain generative AI system vulnerabilities, e.g., hallucination and/or the use of copyrighted material. Once the request management system has determined that the one or more responses satisfies the ruleset and/or the subset of rules, the one or more responses may be sent to the client system.

The request management system may provide a framework that allows entities, such as corporations, businesses, organizations, and/or enterprise computing systems, to efficiently manage the integration and use of generative AI systems. This management may avoid and/or prevent direct client system and/or user interaction with the generative AI system(s). Additionally, the framework allows the entity to provide cohesive controls for the type of information that may be provided to a generative AI system in a query. Similarly, the framework may allow for control and/or management of the information received via the generative AI system responses. This framework can be utilized by a variety of client systems for a variety of generative AI systems. The implementation of the request management system allows entities to efficiently integrate generative AI systems into their workflow. Additionally, the request management system may implement security, observability, and/or operational controls in addition to controls implemented by a generative AI system and/or vendor.

Various embodiments of these features will now be discussed with respect to the corresponding figures.

FIG. 1A depicts a block diagram of a generative AI system integration environment 100A, according to some embodiments. Generative AI system integration environment 100A includes client systems 110, request management system 120, and generative AI systems 150. In some embodiments, request management system 120 may include client application programming interface (API) gateway 122, client identification (ID) platform 124, controls service 130, generative AI gateway 126, and key storage 128. Request management system 120 may administer security and/or observability protocols for both queries from client systems 110 and/or responses from generative AI systems 150. Security protocols may include authentication of client systems 110 and/or generative AI systems 150 and/or authentication and/or authorization of users of such systems. Additionally, controls service 130 may implement security protocols to identify a ruleset applicable to the content of a query and/or request and/or determine that the content of the query and/or response satisfies the ruleset prior to forwarding to generative AI systems 150 or client systems 110, respectively.

Request management system 120 may be implemented using one or more servers, services, databases, and/or a combination thereof. For example, request management system 120 may be implemented using one or more enterprise servers, databases, and/or computer system 500 as described with reference to FIG. 5 to perform the generative AI query and response management described herein.

Request management system 120 may authenticate client system 110 via client API gateway 122 and client ID platform 124. Client systems 110 may include client applications, developer systems, generative AI libraries, software development kits, and/or other applications or systems that may provide queries to generative AI systems 150. Client system 110 may be a personal computer, laptop computer or other personal computing device capable of communicating with request management system 120 via a network. For example, request management system 120 may be implemented on an enterprise computing platform. Client system 110 may communicate with the enterprise computing platform to provide generative AI requests and/or queries that may be received by request management system 120.

In some embodiments, prior to receiving a query from client system 110 and/or a request for a response from one or more generative AI systems 150, request management system 120 may authenticate client system 110. For each client system 110, an internal authorization token may be used to authenticate client system 110. The authentication token may be generated by client system 110 and/or validated by client ID platform 124. Communication between client systems 110 and client ID platform 124 may be facilitated using client API gateway 122. For example, the authentication token can represent a combination of a username and a password, which is generated by the user of client system 110. Client ID platform 124 may validate the generated authentication token before the client system 110 is able to send a query to request management system 120. In some embodiments, other forms of authentication tokens may be used, including hardware tokens, e.g. a USB device or smartcard, and software tokens, e.g. JSON web token (JWT) and two-factor authentication systems.

In some embodiments, request management system 120 may receive a query for a generative AI system with a request for a response from one or more generative AI systems 150 via client API gateway 122. Client systems 110 may connect to client API gateway 122 via one or more network layers within an open systems interconnection (OSI) model. For example, client systems 110 may connect to client API gateway 122 via a layer 7 (L7) proxy. The L7 proxy may be an application layer that may have an internal domain. Client systems 110 may also connect using a hypertext transfer protocol (HTTP) to communicate with client API gateway 122. In some embodiments, client systems 110 may connect to client API gateway 122 via a layer 4 (L4) proxy. The L4 proxy may refer to the transport layer that may act as an intermediary between client system 110 and client API gateway 122. Client systems 110 may communicate using a Transmission Control Protocol (TCP) and/or User Datagram Protocol (UDP) data transfer protocols. In some embodiments, client systems 110 may connect to client API gateway 122 via a layer 3 (L3) proxy. The L3 proxy may refer to the network layer. For example, the L3 proxy may utilize the Internet Protocol (IP).

In some embodiments, an internal network web proxy may communicate the request and query to client API gateway 122. Legacy systems may use L3/L4 proxies and the alternative path of connecting to client API gateway via a L3/L4 proxy may allow legacy client systems 110 to be seamlessly integrated into environment 100A. This may provide integration and/or communications with request management system 120. In some embodiments, a request may be entered on client system 110 to initiate a request with a query for a generative AI system 150. For example, the request may specify a particular generative AI system 150. An example of such a request may be an HTTP request for a specific generative AI system 150. The request may indicate that client system 110 would like the content of the query associated with the request to be forward to an identified generative AI system 150 and may request a response in return. However, before the request and query are forwarded to one or more generative AI systems 150, additional security and observability protocols may be administered via controls service 130.

Controls service 130 may include observability service 132, synchronous controls 134, and/or asynchronous controls 136. Controls service 130 may be utilized by request management system 120 to administer security and observability protocols. For example, observability service 132 may analyze metadata associated with the hypertext transfer protocol (HTTP) requests and/or responses to determine performance analytics regarding client system 110 requests and generative AI systems 150 responses. Synchronous controls 134 and asynchronous controls 136 may administer security protocols by determining whether the content of the queries and responses satisfies a ruleset. The ruleset may be provided, modified, and/or stored in controls database 140. Queries and responses that satisfy the ruleset may be forwarded to the corresponding generative AI systems 150 and client systems 110, respectively. Synchronous controls 134 may use the ruleset in real-time to determine whether queries and responses should be forwarded. Asynchronous controls 136 may use the content of the queries and responses to update the machine learning models for the model-based rules in the ruleset, discussed below.

As previously described, observability service 132 may collect metadata associated with the requests and responses to determine performance analytics. In some embodiments, observability service 132 may use HTTP headers of the requests and responses to collect data such as usage of individual generative AI systems 150, frequency of requests from client systems 110, request and/or response timing data, and other metrics that may be measured using the metadata associated with the requests and responses. For example, observability service 132 may collect metadata from responses from one or more generative AI systems 150. The data may be stored in controls database 140 or another storage service. Based on the HTTP headers of requests, observability service 132 may determine which of the generative AI systems 150 are requested most frequently. In some embodiments, observability service 132 may track which responses do not satisfy the ruleset administered in synchronous controls 134. Observability service 132 may also be able to determine fine-grained observations as well. For example, observability service 132 may identify an instance and/or amounts of instances where responses from each generative AI system 150 do not satisfy each of the rules of the ruleset.

Additionally, observability service 132 may determine data driven observations regarding client systems 110, requests, queries, responses, and generative AI systems 150, individually or as a whole. In some embodiments, observability service 132 may periodically produce a report, detailing performance metrics for request management system 120, queries from client systems 110, and/or responses from generative AI systems 150.

Synchronous controls 134 may be a service used to evaluate a particular generative AI query or response and to determine whether to forward the generative AI query or response. To make this determination, synchronous controls 134 may utilize a ruleset and/or one or more machine learning models. In some embodiments, the ruleset can include one or more conditions for forwarding the query or response. Synchronous controls 134 may access a ruleset stored in controls database 140. The ruleset may include conditions that indicate whether the query may be forwarded to generative AI systems 150. For example, the ruleset may include a rule regarding character limit, which limits the number of characters in the content of the query forwarded to generative AI systems 150. If the content of the query exceeds the character limit, then the query requesting a response from generative AI systems 150 may be denied. Similarly, upon receipt of a response from a generative AI system 150, synchronous controls 134 may access a subset of the ruleset to determine if the response should be forwarded to the client system 110. In some embodiments, not every rule may be administered for every query and/or response. The rules administered may depend on client systems 110, the content of the query, generative AI systems 150, the content of the response, and/or a combination of these factors. Additionally, regardless of these factors, heightened or lowered security protocols of an enterprise computing platform may determine when certain rules are administered. In some embodiments, rules may be stored in controls database 140 and accessed by synchronous controls 134 and asynchronous controls 136.

Asynchronous controls 136 may be a service used to asynchronously retrain and/or update the ruleset used by synchronous controls 134. This may occur as a process separate from the evaluation of whether to forward a particular generative AI query or response, which may be performed by synchronous controls 134. Asynchronous controls 136 may use queries from client systems 110 and/or responses from generative AI systems 150 to train a machine learning model. In some embodiments, the machine learning model may analyze the content of the queries and responses and update the ruleset stored in controls database 140. The machine learning model may update the ruleset to account for new query content that may be inappropriate, contain sensitive information, or exploit vulnerabilities of generative AI systems 150. The model-based rules may be updated periodically. For example, depending on the number of queries and requests that request management system 120 handles, the model-based rules may be updated at periodic intervals including daily, weekly, monthly, and/or yearly updates. Additionally, if asynchronous controls 136 determines that the ruleset being used by synchronous controls 134 should be updated outside of a set interval time, asynchronous controls 136 may have the ability to update the model-based rules as needed. Additionally, the model-based rules may be updated independently of each other. For example, some rules may be used for frequently than others and therefore require more frequent updates.

As described above, in some embodiments controls database 140 stores the ruleset to be used in determining whether to forward a query from client system 110 to generative AI systems 150 and/or whether to forward a response from one or more generative AI system 150 to client system 110. Controls database 140 may store the ruleset used by synchronous controls 134 and/or asynchronous controls 136. In some embodiments, controls database 140 may include a specialized vector database for the ruleset. Vector databases enable systems to access data quickly and efficiently. The vector database uses vector embedding to translate text in the content of the queries and responses to a vector. This allows synchronous controls 134 to efficiently determine whether the content of the queries and responses meet the rules criteria for forwarding. Additionally, asynchronous controls 136 may add new content from the queries and responses to the machine learning model.

The ruleset may include two types of rules: non-model-based rules and model-based rules. Examples of non-model-based rules include: a blocklist (substrings of the text string in the content of the query may not satisfy the rule), regular expressions (certain regular expressions, e.g., syntax used to match strings with a specific pattern, may not satisfy the rule), maximum count thresholds (e.g., character count, word count, emoji count, non-alphanumeric count), closed domain hallucination monitor (compare response content to known hallucination patterns), copyright monitoring via a knowledge base (compare responses with known copyrighted material), and word frequency. These rules may have previously identified thresholds, patterns, and/or prompts to identify in queries and responses.

Model-based rules may use models to determine whether the content of the queries and responses satisfy the ruleset and can be forwarded. Model-based rules may include: self-safety monitor (request management system 120 independently prompts generative AI systems 150 to ensure the response matches an expected response), self-purpose monitor (prompt generative AI system 150 to ensure purpose string of the request (used to request access to generative AI system 150) does not align with prompt injection patterns), response voting (prompt the generative AI system 150 multiple times with the same query to generate several response and select the best), named entity detection (detect named entities, e.g., companies, people, trademarks that do not satisfy the rule), personal identifiable information (PII) monitor (prevent personal identifiable information from being forwarded to generative AI systems 150), and spell-checker.

The models for the individual rules may be machine learning models, which may be trained, re-trained, and/or updated using the content from previous queries and responses to better identify future occurrences of the specific content (e.g., text, phrasing, etc.) the rule is trying to protect against. For example, the named entity detection rule may be implemented using a machine learning model. The machine learning model may use a model of known entities (e.g., people, companies, and/or technologies) to determine if those entities appear in the content of the queries or responses. For example, the named entity model may identify a company name in a query or response and prevent the query or response from being forwarded. In some embodiments, the named entity model may be a machine learning model, which can use to identify the content of queries and responses to identify named entities not previously included in the model, e.g., based on patterns in phrasing or text.

In some embodiments, individual rules in the ruleset may be directed to different characteristics of the content of the queries and responses. The rules may be used in combination to protect against identified vulnerabilities in generative AI systems 150. These vulnerabilities may include leakage of personal identifiable information (PII), toxicity, glitch tokens, unwanted topics, out-of-context information, hallucination prevention, bias, code leakage, prompt injection prevention, and/or copyright violations. For example, generative AI systems 150 use the information in the queries submitted to the generative AI system 150 to train the generative AI. For this reason, entities working with customer data and/or PII may not want that data to be used to train generative AI systems 150. Additionally, if a data breach or data leak were to occur for the generative AI system 150 it could put customers' PII at risk. Request management system 120 may therefore prevent such sensitive information from being transmitted to and/or used by generative AI systems 150.

Synchronous controls 134, using the ruleset, may prevent PII from exiting the entity's or organization's internal network and being used in generative AI systems 150. For example, rules including blocklist (identified strings that should not be forwarded), regular expression (regular expressions that should not be forwarded), self-safety monitor (prompt the generative AI to ensure that the received response matches the expected response), named entity detection (named entities that should not be forwarded), PII monitor (detect PII in content that should not be forwarded), and copyright monitoring (prevent content containing copyrighted material from being forwarded) may be used individually and/or in combination to prevent content in queries and responses containing PII to be forwarded to generative AI systems 150 and/or to client systems 110. By providing synchronous controls 134 with the ruleset, an entity's or organization's security policies and/or quality standards can be implemented consistently to each query from a client system 110 and/or each response from a generative AI system 150. This may provide increased security to systems where individual users and/or generative AI system vendors are in control of this task.

Generative AI gateway 126 and/or key storage 128 may manage credential information for communicating with generative AI systems 150. For example, generative AI gateway 126 and/or key storage 128 may manage credential information used to provide queries to generative AI systems 150. From the perspective of a particular generative AI system 150, queries may be received from request management system 120 without an identification of the particular client system 110 providing the query. For example, request management system 120 may use credentials corresponding to and/or identifying request management system 120.

Generative AI gateway 126 and/or key storage 128 may also authenticate generative AI systems 150 prior to forwarding a query from client system 110 that has been approved by controls service 130. Similar to the functionality of client API gateway 122 and client ID platform 124, generative AI gateway 126 may use authentication keys stored in key storage 128 to authenticate generative AI systems 150. In some embodiments, generative AI systems 150 are authenticated each time request management system 120 transmits a query to a generative AI system 150. The authentication may be valid until request management system 120 receives a response from the corresponding generative AI system 150. Generative AI gateway 126 may connect with individual generative AI systems 150 through a dedicated virtual private network (VPN).

Generative AI systems 150 may include one or more external generative AI systems that may receive queries with a request for a response from one or more client systems 110 via request management system 120. Generative AI systems 150 are integrated into environment 100A by having an endpoint of the generative AI system 150 registered. Once registered, request management system 120 may forward queries to one or more generative AI systems 150. In some embodiments, request management system 120 may forward a single query to multiple generative AI systems 150. A client system 110 may transmit a request to receive responses from one or more generative AI systems 150. This may also be prompted by the client system's 110 query and/or request, e.g., an HTTP request, that is directed to a specified generative AI system 150. In response to such a request, request management system 120 may also independently send the query to multiple generative AI system. For example, responses from multiple generative AI systems 150 may be used for training the machine learning models for model-based rules. In some embodiments, to administer certain rules of the ruleset, synchronous controls 134 may utilize responses from multiple generative AI systems 150. In some embodiments, instead of forwarding the query to multiple generative AI systems 150, request management system 120 may forward (or prompt) a single generative AI system 150 multiple times with the same query, e.g., for administration of the response-voting rule.

Figure 1B:
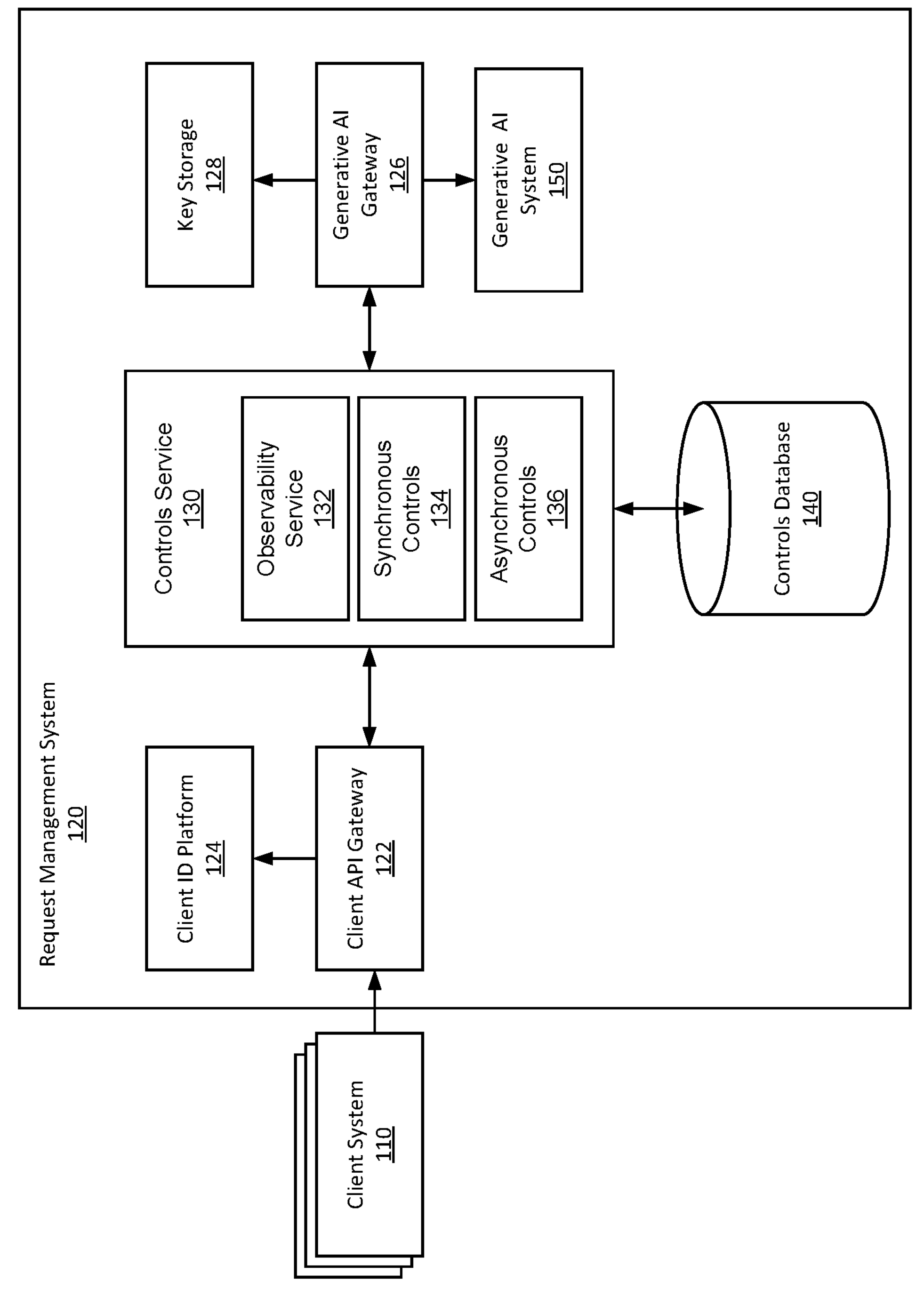
FIG. 1B depicts a block diagram of an internal generative AI system integration environment, according to some embodiments.

FIG. 1B depicts a block diagram of an internal generative AI system integration environment 100B, according to some embodiments. Similar to environment 100A, environment 100B includes client systems 110, request management system 120, and generative AI system 150. Instead of generative AI systems 150 being located external to request management system 120, environment 100B includes generative AI system 150 located internally to request management system 120. As shown in FIG. 1B, generative AI system 150 is a part of request management system 120. In environment 100B the entity or organization controlling or implementing request management system 120 may also directly implement generative AI system 150, rather than a vendor. For example, request management system 120 and generative AI system 150 may be implemented on an organization's enterprise computing platform and/or cloud computing platform.

In environment 100B, generative AI system 150 may face the same or similar vulnerabilities as an external generative AI system, e.g., hallucinations and/or prompt injection. Therefore, request management system 120 may continue to act as an intermediary between client systems 110 and generative AI system 150 to administer security and/or observability protocols. For example, controls service 130, via synchronous controls 134, may administer the ruleset as if generative AI system 150 was an external generative AI system 150. Request management system 120 may operate in the same manner as described with reference to FIG. 1A.

Figure 2:
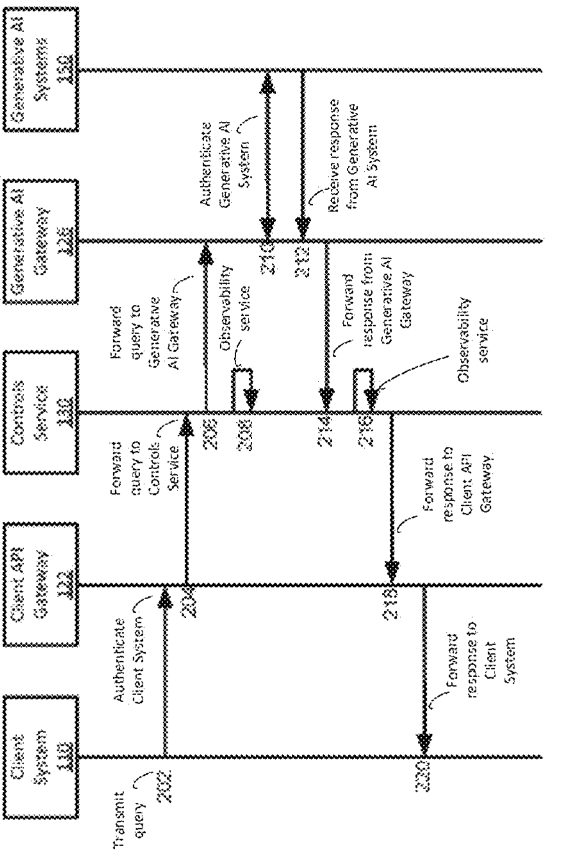
FIG. 2 depicts a process flow diagram of an exemplary method for transmitting a query to and receiving a response from one or more generative AI systems, according to some embodiments.

FIG. 2 depicts a process flow diagram of an exemplary method 200 for transmitting a query to and receiving a response from one or more generative AI systems 150, according to some embodiments. Method 200 may include interactions between one or more client systems 110, client API gateway 122, controls service 130, generative AI gateway 126, and one or more generative AI systems 150. Method 200 includes an interaction that transmits a query with a request for a response from one or more client systems 110 to one or more generative AI systems 150 while implementing security and observability protocols via a request management system 120.

At 202 and 204, client system 110, via client API gateway, may perform a login process to authenticate the client system 110. For example, at 202, client system 110 may transmit one or more authentication tokens, e.g., login credentials, to client API gateway 122. Client API gateway 122 may validate the login credentials of client system 110 via client ID platform 124. As previously explained, various forms of authentication tokens may be used to authentication client system 110 including software and/or hardware tokens. At 202, client system 110 may also transmit a query for content from a generative AI system 150. Client API gateway 122 may receive the query. At 204, after client system 110 is authenticated, client API gateway 122 may forward the query to controls service 130.

At 206, controls service 130 may forward the query to generative AI gateway 126 after determining the query satisfies a ruleset maintained by request management system 120. In some embodiments, synchronous controls 134 may identify a ruleset applicable to the query from client system 110. As described above, the ruleset applicable to the query may depend on which client system 110 initiated the query and request, the content of the query, the generative AI system(s) 150 the query is requesting a response from, and/or additional security protocols that may be applicable. Synchronous controls 134 may access the ruleset from controls database 140. Controls database 140 may store the ruleset as one or more data structures and/or configuration files. Synchronous controls 134 may determine the content of the query satisfies the applicable ruleset and forward the query to generative AI gateway 126 at 206.

Additionally, at 208, observability service 132 and asynchronous controls 136 may use information corresponding to the request and content of the query for additional controls service 130 operations. Observability service 132 may extract and store metadata associated with the query, e.g., the HTTP request header which may identify the requested generative AI system 150 endpoint. The metadata extracted may be stored in controls database 140, or another applicable storage service. Observability service 132 may use the stored information from a plurality of queries and responses to calculate performance analytics for the system and/or statistical information regarding client systems 110, the queries, generative AI systems 150, and/or the responses. This data may inform security and/or observability protocols of request management system. For example, this data may prompt future adjustments or changes to the ruleset and/or permissions corresponding to client systems 110 and generative AI systems 150. For example, these permissions may indicate whether a particular system is approved to use request management system 120.

Asynchronous controls 136 may use the content of the queries to train the machine learning models stored in controls database 140. As described above, controls database 140 may be a vector database, which uses vector embedding to translate text (e.g., the content of the query) into a vector. This vector indicates information about the content of the query that can be used to efficiently train the machine learning models used for implementing model-based rules.

In some embodiments, request management system 120 may include client application programming interface (API) gateway 122, client identification (ID) platform 124, controls service 130, generative AI gateway 126, and key storage 128. Request management system 120 may act as central point to administer security and observability protocols for both queries from client systems 110 and responses from generative AI systems 150. Security protocols may include authentication of both client systems 110 and generative AI systems 150. Additionally, security protocols may include controls service 130 identifying a ruleset applicable to the content of a query and/or request and determining that the content of the query and/or response satisfies the ruleset prior to forwarding to generative AI systems 150 or client systems 110, respectively.

At 210, generative AI gateway 126 may perform an authentication process with the one or more generative AI systems 150. This may occur prior to forwarding the query. As previously described, generative AI gateway 126 may exchange login credentials, tokens, and/or encryption keys with one or more generative AI systems 150. In some embodiments, the one or more generative AI systems 150 may be authenticated using similar methods described for authenticating client systems 110. However, instead of internal authentication tokens used for client systems 110 and validated via client ID platform 124, the authentication tokens used to authenticate generative AI systems 150 may be external tokens. For example, the tokens are used for authentication with external systems, e.g., generative AI systems 150. The authentication tokens used at 210 may be stored in key storage 128 rather than with authentication tokens associated with client ID platform 124.

Also at 210, generative AI gateway 126 may transmit the request to one or more generative AI systems 150. In some embodiments, generative AI gateway 126 may transmit the request to one or more generative AI systems 150 that were identified in the request. For example, the header of an HTTP request from client system 110 may indicate a specific generative AI system 150 from which the client system 110 is requesting a response to the corresponding query. In some embodiments, regardless of whether client system 110 requested a response from a specific generative AI system 150, generative AI gateway may transmit the request and query to multiple generative AI systems 150. For example, request management system 120 may provide an instruction that the query be transmitted to multiple registered generative AI systems 150 and/or a subset of the registered generative AI systems 150.

At 212, generative AI gateway 126 may receive the response from the one or more generative AI systems 150. For example, generative AI gateway 126 may receive a response from a particular generative AI system 150. In some embodiments, when generative AI gateway 126 transmitted a query to multiple generative AI systems 150, generative AI gateway 126 may receive multiple response. These responses may be received at different times. Generative AI gateway 126 may forward the responses to request management system 120 as generative AI gateway 126 receives them. In some embodiments, generative AI gateway 126 may temporarily cache the responses in a secondary storage until each of the corresponding responses is received. Generative AI gateway 126 may then transmit multiple responses to request management system 120.

At 214, generative AI gateway 126 may forward the response to controls service 130. In some embodiments, the response may be forwarded to controls service 130 from generative AI gateway 126 without additional authentication.

At 214 and 216, controls service 130 may repeat a similar security and observability process as described with reference to 206 and 208. However, for synchronous controls 134 and asynchronous controls 136, a subset of rules may be applicable only to responses rather than queries. For example, the model-based response voting rule may be directed to selecting the best response out of a plurality of responses when the query is forwarded several times. This may be based on user or recipient feedback and/or identification by a system administrator. In some embodiments, for rules that may require multiple responses, requests may be repeatedly forwarded at 208 and 210 or forwarded again at 214 while synchronous controls 134 is determining if the response satisfies the applicable subset of rules.

At 218 and 220, controls service 130 may determine that the response satisfies the applicable subset of rules and may forward the response to client system 110 via client API gateway 122. As described at 202 and 204, client systems 110 may have already been authenticated. Therefore client API gateway 122 may not re-authenticate client system 110. In some embodiments, client API gateway 122 may re-authenticate client system 110 prior to providing the response. For example, there may be timeframe threshold, e.g., a maximum amount of time between sending a query and receiving a response, that may be exceeded and require client systems 110 to be re-authenticated before forwarding the response. Re-authentication may occur in a manner similar to 202 and 204.

Figure 3A:
FIG. 3A depicts a flowchart illustrating a method for transmitting a query to one or more generative AI systems, according to some embodiments.
Figure 3A:
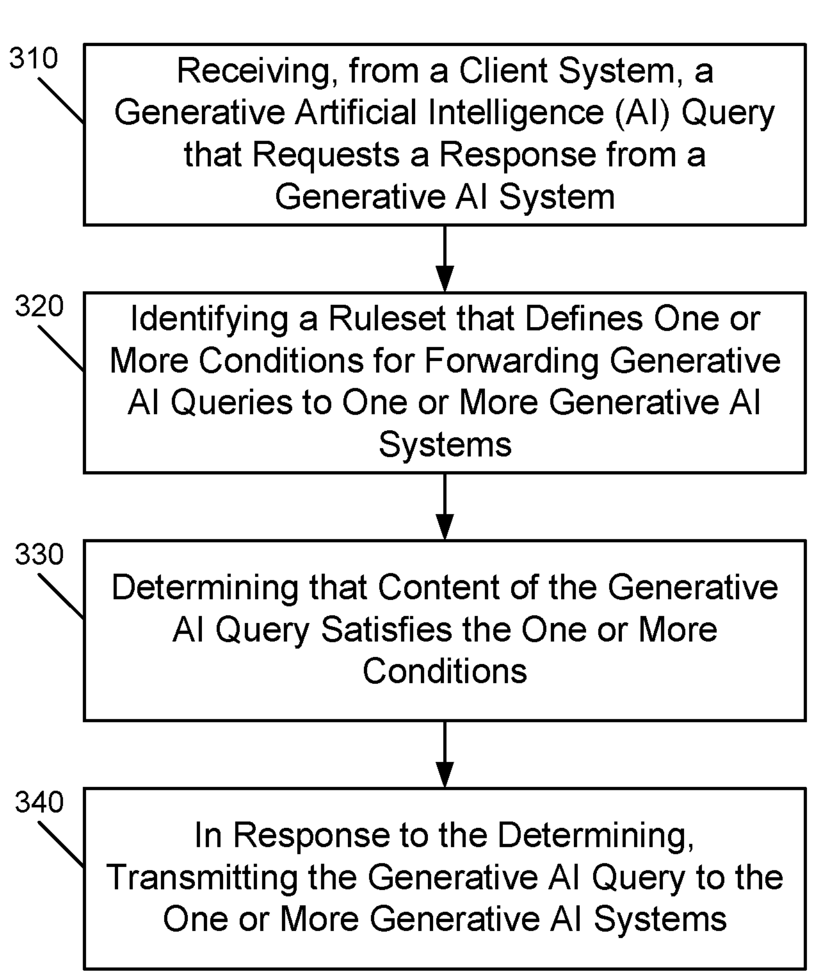

FIG. 3A depicts a flowchart illustrating a method for transmitting a query to one or more generative AI systems, according to some embodiments. Method 300A shall be described with reference to FIGS. 1A, 1B, and 2. However, method 300A is not limited to that example embodiment. In some embodiments, a single query may be forwarded to one or more generative AI systems 150.

In an embodiment, request management system 120 may utilize method 300A to apply a ruleset to a request for content from a generative AI system 150. The request may be received from a client system 110. The foregoing description will describe an embodiment of the execution of method 300A with respect to request management system 120. While method 300A is described with reference to request management system 120, method 300A may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 310, request management system 120 may receive, from client system 110, a generative AI query that requests a response from at least one generative AI system 150. Prior to and/or when receiving the query, client systems 110 may be authenticated using an authentication token that may be validated by client ID platform 124 via client API gateway 122. Client system 110 may request that the query be forwarded to at least one of the registered generative AI systems 150. The request may or may not specify a specific generative AI system 150 to receive the query. In some embodiments, the client system 110 may request that the query be forwarded to multiple generative AI systems 150. If controls service 130 determines that the query satisfies the identified ruleset, request management system 120 may forward the quest to the one or more specified generative AI systems 150 or to a default generative AI system 150 if none was specified.

At 320, request management system 120 may identify a ruleset that defines one or more conditions for forwarding generative AI queries to one or more generative AI systems. As previously described, request management system 120 may use controls service 130 to perform this identification. Specifically, synchronous controls 134 may identify a ruleset from the rules stored in controls database 140 that may indicate the query should be forwarded to one or more generative AI systems 150 if satisfied. As discussed previously, not every rule may be applicable to each query. For example, word count and emoji count may be rules identified for queries. The content of the query may include a text string without emojis, therefore the emoji count rule may not be applicable to the specific query. In some embodiments, certain client systems 110 may have rules that may be applied to queries received from the specific client system 110. For example, some client systems 110 may have access to detailed PII. In this case, each PII rule may be identified by synchronous controls 134 for queries from client system 110 regardless of the content of the query.

In some embodiments, synchronous controls 134 may select one or more rules from each of the identified vulnerabilities in generative AI systems 150, such as personal identifiable information (PII), toxicity, glitch tokens, unwanted topics, out-of-context information, hallucination prevention, bias, code leakage, prompt injection prevention, and copyright. This may allow synchronous controls 134 to reliably and/or consistently forward only queries that satisfy the overarching security protocols with conditions the rules were developed to satisfy.

At 330, request management system 120 determines that content of the generative AI query satisfies the one or more conditions defined by the ruleset and may be forwarded to one or more generative AI systems 150. In some embodiments, synchronous controls 134 may determine whether content of the query satisfies each of the identified rules and/or conditions for forwarding the generative AI query. For example, for given queries, synchronous controls 134 may have identified the blocklist, regex, word count, self-safety monitor, and/or PII monitor. Synchronous controls 134 may determine the content of the query satisfies each of the rules. The query may be forward if there are no phrases matching the blocklist, regular expressions that are blocked, the word count is below the maximum identified in the rule, the self-safety monitor prompt matches the expected prompt, and/or there is no identifiable PII in the content. If any of these conditions fails, the ruleset is not satisfied and the query may not be forwarded. To alert client system 110, an error notification may be sent to client systems 110. For example, in some embodiments an HTTP error code may be sent to client system 110. The HTTP error code may be used by client systems 110 to display an error notification message on via a display device at client systems 110. Each client system 110 may handle communication and/or display of error codes, notifications, and/or data associated with the error according to the existing functionality of the client system 110.

At 340, in response to determining that content of the query satisfies the ruleset, request management system 120 transmits the generative AI query to the one or more generative AI systems 150. In some embodiments, the query and request may have specifically identified a generative AI system 150 to forward the request to for a response. In some embodiments, a default generative AI system 150 may be selected by request management system 120. In some embodiments, request management system 120 may forward the query to one or more generative AI systems 150 that were not specified. For example, this may be used to check synchronous controls 134 functionality and/or for asynchronous controls 136 to train the model based rules.

Figure 3B:
FIG. 3B depicts a flowchart illustrating a method for forwarding a response from one or more generative AI systems to a client system, according to some embodiments.
Figure 3B:
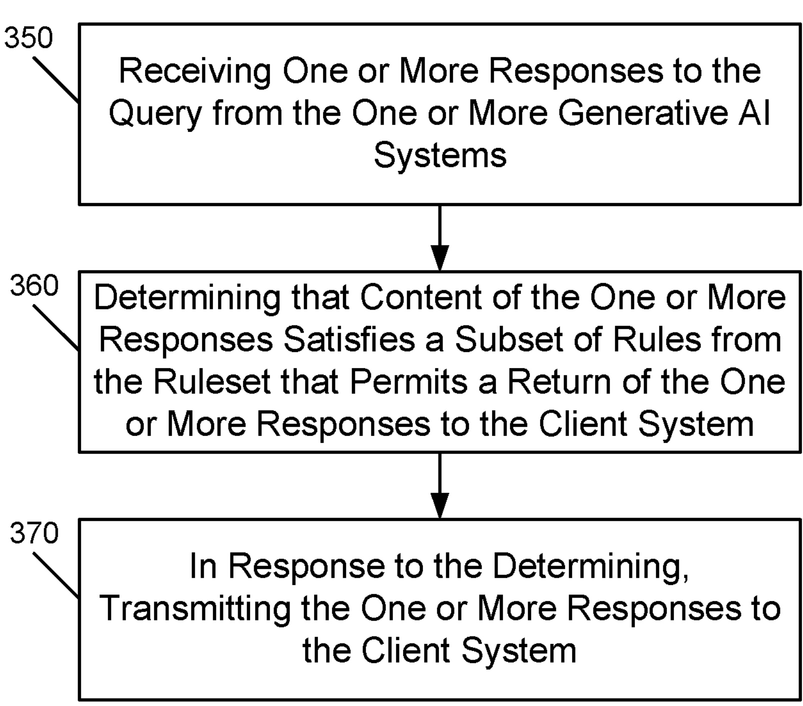

FIG. 3B depicts a flowchart illustrating a method 300B for forwarding a response from one or more generative AI systems 150 to a client system 110, according to some embodiments. Method 300B shall be described with reference to FIGS. 1A, 1B, 2, and 3A. However, method 300B is not limited to that example embodiment. In some embodiments, a single query may be forwarded to one or more generative AI systems 150. Responses may be returned to a client system 110 from the one or more generative AI systems 150.

In an embodiment, request management system 120 may utilize method 300B to apply a ruleset to a response and/or responsive content received from a generative AI system 150. The response content may be received in response to a query forwarded to the generative AI system 150. The foregoing description will describe an embodiment of the execution of method 300B with respect to request management system 120. While method 300B is described with reference to request management system 120, method 300B may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3B, as will be understood by a person of ordinary skill in the art.

At 350, request management system 120 receives one or more responses to the query from the one or more generative AI systems 150. As described with reference to FIG. 3, request management system 120 may send a query to one or more generative AI systems 150 on behalf of client system 110. Request management system 120 may serve as a central point to make sure security and observability protocols are applied consistently to responses from one or more generative AI systems 150.

At 360, request management system 120 determines that content of the one or more responses satisfies a subset of rules from the ruleset that permits a return of the one or more responses to the client system 110. In some embodiments, synchronous controls 134 determines that content of received responses satisfies the ruleset and/or one or more conditions specified in the ruleset for returning generative AI responses to a client system 110. Similar to the queries described in method 300A, synchronous controls 134 may identify rules in controls database 140 to be applied to the one or more responses from the corresponding one or more generative AI systems 150. For example, a closed domain hallucination monitor process may check for hallucination patterns in the content of the response. In some embodiments, synchronous controls 134 may apply the same set of rules and/or conditions to each of the one or more responses. In some embodiments the identified subset of rules may be individually selected for each of the responses and/or generative AI system 150.

At 370, in response to determining that the one or more responses satisfy the subset of rules, request management system 120 transmits the one or more responses to client system 110. In some embodiments, when each of the one or responses is determined to satisfy the subset of rules, the responses are forwarded to client system 110. If a response does not satisfy the identified subset of rules it is not forwarded to client system 110. When one or more responses are received from a single query forwarded to multiple generative AI systems 150, if a response does not satisfy the subset of rules and another does, the response that satisfies the subset of rules may be forwarded. For example, a query may be forwarded to multiple generative AI systems 150. If the responses from a first and a second generative AI system 150 satisfy the identified subset of rules, the responses may be forwarded to client system 110. However, if the response from a third generative AI system 150 does not satisfy the response, this response may not be forwarded to client system 110. Regarding the response that do not satisfy the subset of rules, request management system 120 may forward an error code to client system 110 to indicate that the response was not forwarded by request management system 120. In some embodiments, this may be an HTTP error code.

Figure 4:
FIG. 4 depicts a flowchart illustrating a method for generating a report indicating query and response performance metrics, according to some embodiments.
Figure 4:
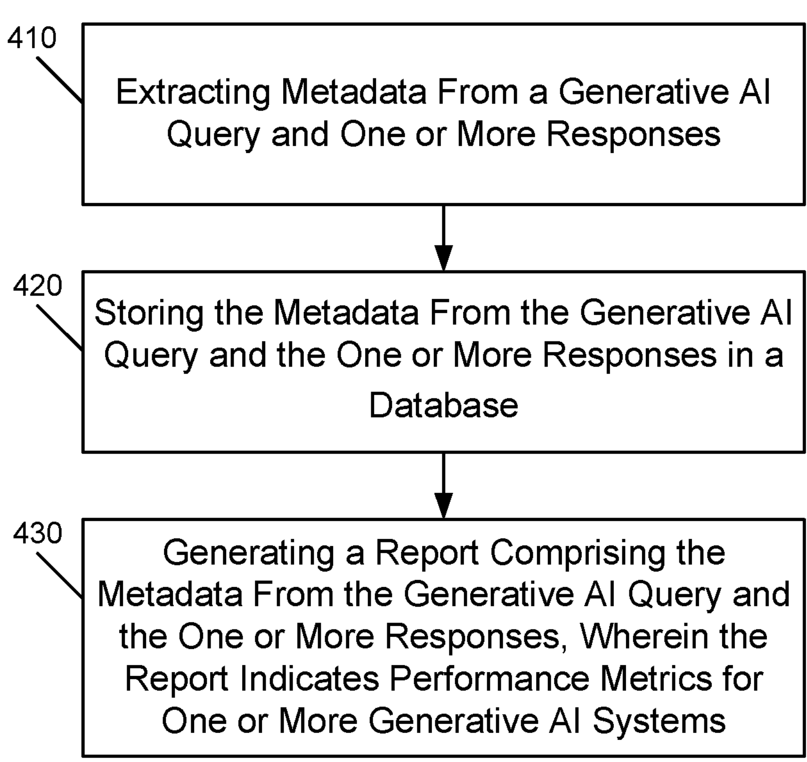

FIG. 4 depicts a flowchart illustrating a method 400 for generating a report indicating query and response performance metrics, according to some embodiments. The performance metrics of the one or more queries and/or one or more responses may be based on the corresponding metadata. Method 400 shall be described with reference to FIGS. 1A, 1B, 2, 3A, and 3B. However, method 400 is not limited to that example embodiment.

In an embodiment, request management system 120 may utilize method 400 to determine performance metrics of queries and/or requests associated with generative AI systems 150, request management system 120, and/or client systems 110. The performance metrics may indicate efficiencies, errors, failed rules for queries and or responses and other data driven metrics that may be used to determine security and operational protocols for request management system 120. The foregoing description will describe an embodiment of the execution of method 400 with respect to request management system 120. While method 400 is described with reference to request management system 120, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 400, as will be understood by a person of ordinary skill in the art.

At 410, request management system 120 extracts metadata from a generative AI query and one or more responses. In some embodiments, the generative AI query and/or the one or more responses may be similar to those described with reference to FIG. 3A and FIG. 3B. Observability service 132 may extract metadata from the generative AI query and responses. The metadata may comprise timing data, generative AI system 150 the query requested a response from, and/or client system 110 that originated the request. Additionally some queries and/or responses may not be forwarded. For example, the content of the queries and/or responses may not have satisfied the ruleset identified by synchronous controls 134. Observability service 132 may extract metadata indicating which rule(s) of the ruleset identified by synchronous controls 134 the content of the query and/or response did not satisfy.

At 420, request management system 120 stores the metadata from the generative AI query and the one or more responses in a database. In some embodiments, observability service 132 may store the metadata in controls database 140 and/or another storage service. The metadata may be stored such that observability service 132 may access the metadata to determine performance metrics.

At 430, request management system 120 generates a report comprising the metadata from the generative AI query and the one or more responses. The report may indicate performance metrics for the one or more generative AI systems 150. In some embodiments, observability service 132 may generate the report for a single query and/or corresponding responses from generative AI systems 150 based on the metadata stored at 420. For example, the report may indicate which generative AI systems 150 were requested, which generative AI systems 150 received the query from request management system 120, the timing data for client systems 110 to send the request and receive a response, and/or timing data for each step of methods 300A and/or 300B. Additionally, observability service 132 may generate a report of queries from specific client systems 110, responses for specific generative AI systems 150, commonly failed rules by queries and/or responses. These data driven metrics may allow administrators of request management system 120 to modify, change, and/or add security or operational protocols to request management system 120. Additionally, the reports may provide internal feedback regarding which client systems 110 utilize request management system 120 and/or a frequency of usage. The reports may also indicate a frequency of usage of particular generative AI systems 150. This may also indicate which generative AI systems 150 are preferred by users. The report may provide this information along with other metrics indicating performance and/or usage preferences.

Figure 5:
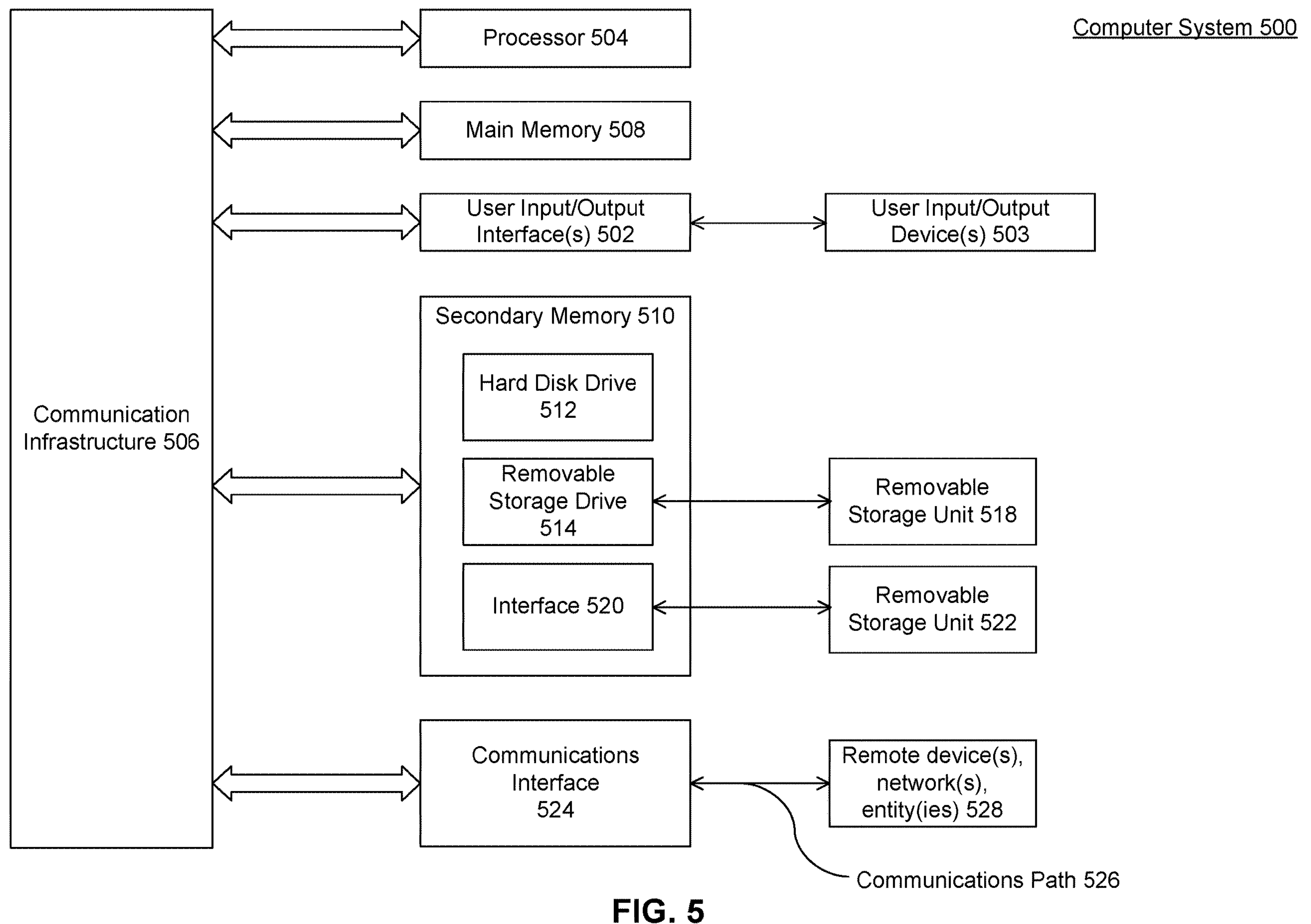
FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:

receiving, from a client system, a generative artificial intelligence (AI) query that requests a response from one or more generative AI systems;

conducting, using a first API gateway, a first authentication of the client system;

in response to the first authentication, evaluating, by a request management system content and HTTP metadata of the generative AI query, wherein the request management system comprises a synchronous control and an asynchronous control, wherein the synchronous control is configured to determine when the content of the generative AI query satisfies one or more conditions of a ruleset and the asynchronous control is configured to asynchronously update a machine learning model based on the content of the generative AI query, wherein the machine learning model is configured to determine the one or more conditions of the ruleset;

identifying, using the synchronous control, the one or more conditions of the ruleset for forwarding generative AI queries to the one or more generative AI systems;

determining, based on the identifying, the content of the generative AI query satisfies the one or more conditions of the ruleset;

updating, using the asynchronous control, the machine learning model that determines the one or more conditions of the ruleset;

in response to the determining, conducting a second authentication, using a second API gateway and a key storage system, of the one or more generative AI systems;

in response to the second authentication, transmitting the generative AI query from the request management system to the one or more generative AI systems; and evaluating, by the one or more generative AI systems, the content of the generative AI query from the request management system.

2. The computer implemented method of claim 1, further comprising:

receiving one or more responses to the generative AI query from the one or more generative AI systems;

determining that content of the one or more responses satisfies a subset of rules from the ruleset that permits a return of the one or more responses to the client system; and in response to the determining, transmitting the one or more responses to the client system.

3. The computer implemented method of claim 2, the determining further comprising:

determining at least one of the one or more responses does not satisfy the subset of rules from the ruleset; and transmitting an error notification to the client system to indicate that content of at least one of the one or more responses does not satisfy the subset of rules.

4. The computer implemented method of claim 2, further comprising:

extracting the HTTP metadata from the generative AI query and the one or more responses;

storing the HTTP metadata from the generative AI query and the one or more responses in a database; and generating a report comprising the HTTP metadata from the generative AI query and the one or more responses, wherein the report indicates performance metrics for the one or more generative AI systems.

5. The computer implemented method of claim 2, wherein one or more rules in the ruleset are implemented using the machine learning model based on a machine learning algorithm trained on content of one or more generative AI queries and one or more corresponding responses received from the one or more generative AI systems.

6. The computer implemented method of claim 5, wherein the machine learning model is trained to detect personal identifiable information (PII) and wherein the one or more conditions of the ruleset prevents forwarding of generative AI queries that include PII.

7. The computer implemented method of claim 5, wherein the machine learning model is trained to detect copyrighted material and wherein the one or more conditions of the ruleset prevents forwarding of responses that include copyrighted material.

8. A system, comprising:

a memory; and at least one processor coupled to the memory and configured to:

receive, from a client system, a generative artificial intelligence (AI) query that requests a response from one or more generative AI systems;

conduct, using a first API gateway, a first authentication of the client system;

in response to the first authentication, evaluating, by a request management system, content and HTTP metadata of the generative AI query, wherein the request management system comprises a synchronous control and an asynchronous control, wherein the synchronous control is configured to determine when the content of the generative AI query satisfies one or more conditions of a ruleset and the asynchronous control is configured to asynchronously update a machine learning model based on the content of the generative AI query, wherein the machine learning model is configured to determine the one or more conditions of the ruleset;

identify, using the synchronous control, the one or more conditions of the ruleset for forwarding generative AI queries to the one or more generative AI systems;

determine, based on the identification, the content of the generative AI query satisfies the one or more conditions of the ruleset;

update, using the asynchronous control, the machine learning model that determines the one or more conditions of the ruleset;

in response to the determination, conduct a second authentication, using a second API gateway and a key storage system, of the one or more generative AI systems;

in response to the second authentication, transmit the generative AI query from the request management system to the one or more generative AI systems; and evaluate, by the one or more generative AI systems, the content of the generative AI query from the request management system.

9. The system of claim 8, wherein the at least one processor is further configured to:

receive one or more responses to the generative AI query from the one or more generative AI systems;

determine that content of the one or more responses satisfies a subset of rules from the ruleset that permits a return of the one or more responses to the client system; and in response to the determining, transmit the one or more responses to the client system.

10. The system of claim 9, wherein to determine the at least one processor is further configured to:

determine at least one of the one or more responses does not satisfy the subset of rules from the ruleset; and transmit an error notification to the client system to indicate that content of at least one of the one or more responses does not satisfy the subset of rules.

11. The system of claim 9, wherein the at least one processor is further configured to:

extract the HTTP metadata from the generative AI query and the one or more responses;

store the HTTP metadata from the generative AI query and the one or more responses in a database; and generate a report comprising the HTTP metadata from the generative AI query and the one or more responses, wherein the report indicates performance metrics for the one or more generative AI systems.

12. The system of claim 9, wherein one or more rules in the ruleset are implemented using the machine learning model based on a machine learning algorithm trained on content of one or more generative AI queries and one or more corresponding responses received from the one or more generative AI systems.

13. The system of claim 12, wherein the machine learning model is trained to detect personal identifiable information (PII) and wherein the one or more conditions of the ruleset prevents forwarding of generative AI queries that include PII.

14. The system of claim 12, wherein the machine learning model is trained to detect copyrighted material and wherein the one or more conditions of the ruleset prevents forwarding of responses that include copyrighted material.

15. A non-transitory computer-readable device having instructions stored thereon that, when executed by at least one computing device, cause the at least one computing device to perform operations comprising:

receiving, from a client system, a generative artificial intelligence (AI) query that requests a response from one or more generative AI systems;

conducting, using a first API gateway, a first authentication of the client system;

in response to the first authentication, evaluating, by a request management system, content and HTTP metadata of the generative AI query, wherein the request management system comprises a synchronous control and an asynchronous control, wherein the synchronous control is configured to determine when the content of the generative AI query satisfies one or more conditions of a ruleset and the asynchronous control is configured to asynchronously update a machine learning model based on the content of the generative AI query, wherein the machine learning model is configured to determine the one or more conditions of the ruleset;

identifying, using the synchronous control, the one or more conditions of the ruleset for forwarding generative AI queries to the one or more generative AI systems;

determining, based on the identifying, the content of the generative AI query satisfies the one or more conditions of the ruleset;

updating, using the asynchronous control, the machine learning model that determines the one or more conditions of the ruleset;

in response to the determining, conducting a second authentication, using a second API gateway and a key storage system, of the one or more generative AI systems;

in response to the second authentication, transmitting the generative AI query from the request management system to the one or more generative AI systems; and evaluating, by the one or more generative AI systems, the content of the generative AI query from the request management system.

16. The non-transitory computer-readable device of claim 15, the operations further comprising:

receiving one or more responses to the generative AI query from the one or more generative AI systems;

determining that content of the one or more responses satisfies a subset of rules from the ruleset that permits a return of the one or more responses to the client system; and in response to the determining, transmitting the one or more responses to the client system.

17. The non-transitory computer-readable device of claim 16, wherein the determining further comprises:

determining at least one of the one or more responses does not satisfy the subset of rules from the ruleset; and transmitting an error notification to the client system to indicate that content of at least one of the one or more responses does not satisfy the subset of rules.

18. The non-transitory computer-readable device of claim 16, the operations further comprising:

extracting the HTTP metadata from the generative AI query and the one or more responses;

storing the HTTP metadata from the generative AI query and the one or more responses in a database; and generating a report comprising the HTTP metadata from the generative AI query and the one or more responses, wherein the report indicates performance metrics for the one or more generative AI systems.

19. The non-transitory computer-readable device of claim 16, wherein one or more rules in the ruleset are implemented using the machine learning model based on a machine learning algorithm trained on content of one or more generative AI queries and one or more corresponding responses received from the one or more generative AI systems.

20. The non-transitory computer-readable device of claim 19, wherein the machine learning model is trained to detect copyrighted material and wherein the one or more conditions of the ruleset prevents forwarding of responses that include copyrighted material.

* * * * *